Patented Feb. 18, 1936

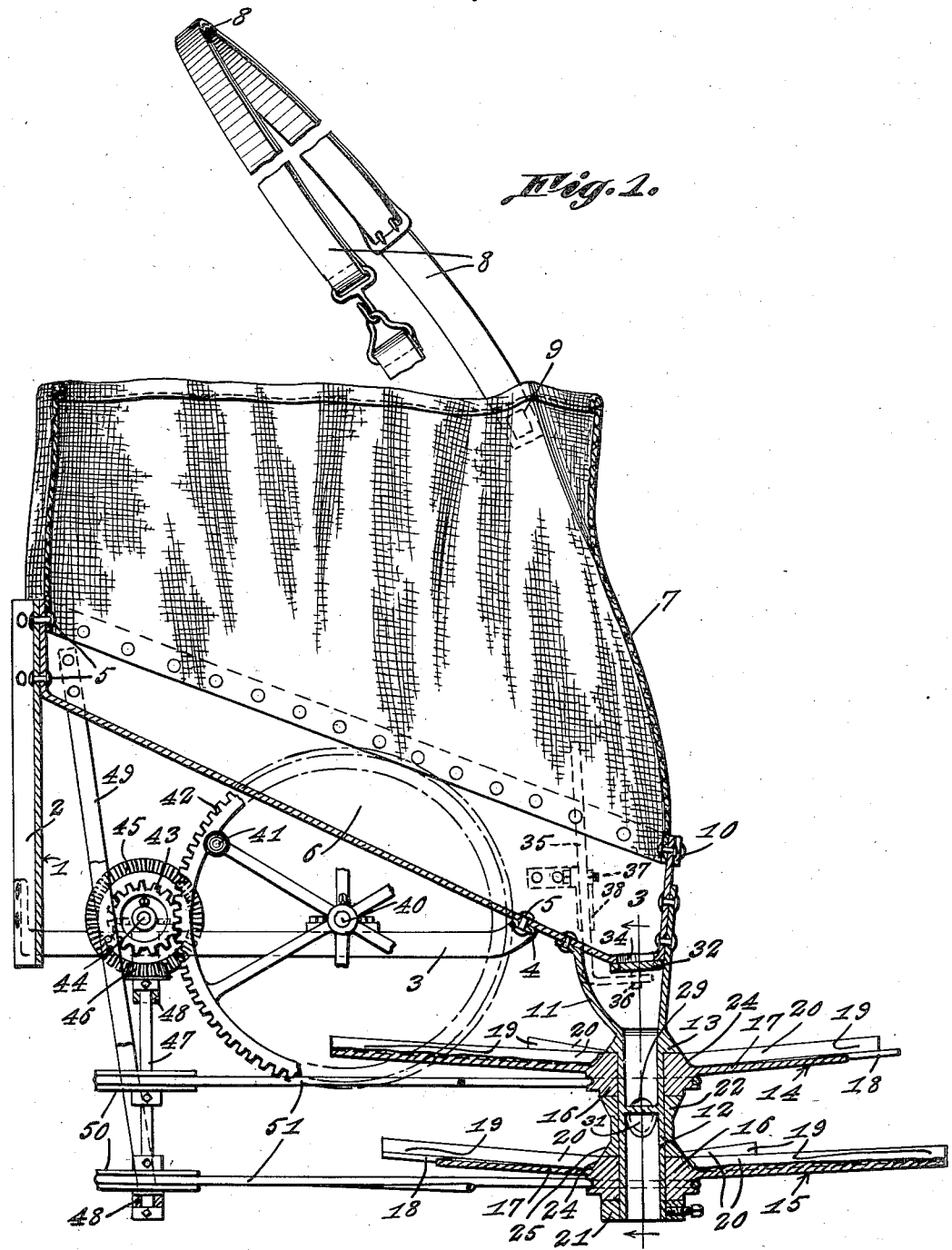

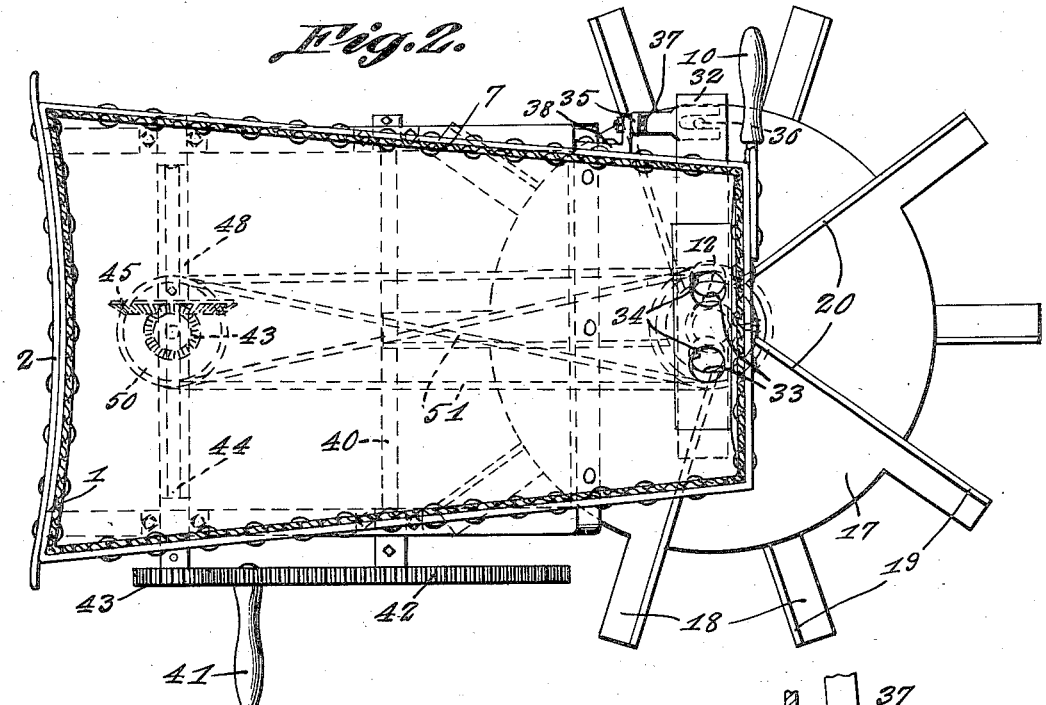

2,031,540

UNITED STATES PATENT OFFICE 2,031,540

BROADCAST SEEDER

Joseph A. Macaulay, De Soto, Wis.

Application May 22, 1935, Serial No. 22,905

7 Claims. (Cl. 275—12)

My invention relates to improvements in seeders of the so-called broadcast type.

An object of my invention, generally stated, is to provide a portable seeder of light simple construction manually operative for distributing the seed uniformly and forwardly of the machine so that the seed will not be thrown back against the operator and its uniform distribution interrupted.

Another object is to provide an improved mounting for a pair of rotatable seed distributing members and efficient means for feeding seed thereto from a seed supply receptacle, together with means for varying in uniform degrees the quantity of seed fed from said receptacle to said members.

Another object is to provide a machine of this character comprising few parts which may be readily assembled or disassembled for replacement purposes and which is durable and economical to manufacture.

To the accomplishment of the above and subordinate objects, presently appearing, a preferred embodiment of my invention has been illustrated in the accompanying drawings and will now be described in detail in the following and defined in the claims appended hereto.

In said drawings:

Figure 1 is a view in transverse vertical section of a seeder embodying the principles of my invention.

Fig. 2 is a view in top plan, and

Fig. 3 is a fragmentary view in vertical transverse section taken on the line 3—3 of Fig. 1 looking in the direction indicated by the arrows.

The illustrated embodiment of my invention comprises a frame 1 including a rear slightly concave plate 2, side bars 3 projecting forwardly from said plate at right angles thereto, and a front cross bar 4 connecting the forward ends of the side bars 3. Secured to the forward side of the plate 2 and the cross bars 4, as by rivets 5, is a seed receptacle 6 inclining forwardly and downwardly from the plate 2 and extending beyond the bar 4. The frame 1 and seed receptacle 6 are preferably constructed of light metal of suitable thickness. Connected to the top edges of the seed receptacle 6 is the usual fabric sack 7 to the upper edges of which straps 8 are connected, as at 9, for securement around the neck or shoulders of the operator to suspend the machine from the shoulders with the plate 2 engaging against the operator. The usual handle 10 is suitably attached to the front of the receptacle 6 to be grasped by the operator to steady the machine and swing it sideways if desired.

Below the seed receptacle 6, at the front end thereof, is a hopper 11 having a hollow shaft 12 depending therefrom, substantially centrally thereof, and formed at its upper end with a conical collar 13 immediately beneath the hopper 11. The shaft 12 forms a feed pipe for a purpose presently clear.

Rotatably mounted on the shaft 12, one above the other, is a pair of seed distributing wheellike members 14 and 15 respectively. Each of said members comprises a hub portion 16, a slightly dished, circular pan portion 17, and radial distributing arms 18 at the edge of said pan, said arms each having an angularly related rib 19 extending along one edge, thereof, and forming a continuation of a similar radial rib 20 on the upper face of the pan portion 17. The distributing members 14 and 15 are retained upon the shaft 12, with the hub portion 16 of the upper pan bearing against the collar 13, by a set collar 21 on the lower end of the shaft 12, and a spool shaped sleeve 22 intermediate said hub portions 16 secured to the shaft 12 by a set screw 23. The hub portions 16 are provided with conical sides 24 which in the instance of the upper member 14 forms a continuation of the conical collar 13, and in the instance of the lower member 15 forms a similar continuation of a conical flange 25 on the lower end of the sleeve 22 whereby there is provided above each pan portion 17 a downwardly and outwardly inclined surface for deflecting seed fed onto said portion outwardly of the latter during the feeding operation. A feed aperture 26 is provided in the lower wall of the hopper 11 immediately above the collar 13 through which the seed in the hopper may gravitate into the upper member 14. A partition 27 divides the hopper 11 into compartments 28, of equal size, with one of which the feed aperture 26 communicates, the other being in communication with the shaft 12. The partition 27 inclines from the inner edge of the aperture 26 inwardly and upwardly to facilitate gravitation of the seed into the aperture 26. Registering feed apertures 29 and 30 are provided in the side of the shaft 12 and sleeve 22, respectively, immediately above the flange 25 of the latter. A partition 31 is provided in the shaft 12 inclining downwardly to the lower edges of said apertures 29 and 30 so that seed may gravitate freely through the upper end of said shaft and through the apertures 29 and 30 on to the lower member 15. Intermediate the seed receptacle 6 and the hopper 11 is a feed varying slide 32 provided with apertures 33 for cooperation with apertures 34 in said receptacle to permit seed in the latter to flow into the hopper 11 in variable quantities as determined by the position of said slide. A lever arm 35, operatively connected to a lug 36 on the slide 32 is pivoted, as at 37, on a bracket arm 38, extending from the receptacle 6, for adjustment by a set screw 39 in said bracket to vary the position of the slide 32 at will.

The members 14 and 15 are rotated in opposite directions, respectively, by the following means. A shaft 40 suitably journaled on the side bars 3 has fast thereon a crank 41 and a tooth wheel 42 meshing with a smaller tooth wheel 43 fast upon a similarly journaled shaft 44. A bevelled gear 45 is fast upon the shaft 44 and meshes with a bevelled gear 46 fast upon a vertical shaft 47 journaled at its opposite ends in cross bars 48 one secured to the side bars 3 and the other supported by bars 49 depending from the receptacle 6. A pair of pulleys 50 are fast upon the shaft 47 and connected by belts 51 to the hub member 16 which is grooved for this purpose. One of the belts 51, preferably the lower one, is crossed to drive the lower member 15 in a direction opposite to the drive of the upper member 14. By operating the crank member 41 clockwise the upper distributing member 14 is rotated counter-clockwise and the lower member 15 clockwise. In this connection it is to be noted that a particular feature of my invention is the location of the feed apertures 26 and 29 and 30. Said apertures are located substantially above the transverse center of the elements 14 and 15, the aperture 26 being on the right hand side of the vertical axis of said members and the apertures 29 and 30 on the left hand side of said axis. By virtue of this arrangement the seed is fed to said members to be thrown forwardly and to opposite sides of the machine and practically none is thrown rearwardly against the operator.

Although a preferred embodiment of my invention has been described in the foregoing, it is to be understood that right is herein reserved to modifications in the described details of construction and arrangement of parts falling within the scope of the appended claims.

What I claim is:

1. In a machine of the class described, a seed supply hopper at the front of the machine, a shaft depending from the bottom of said hopper and having a longitudinal bore in communication with said hopper, a pair of seed distributing members rotatably mounted on said shaft in superposed relation, said hopper and shaft each having a discharge aperture therein for gravitational feed of seed therethrough from the hopper to one of said members, said apertures being disposed upon opposite sides of the axis of rotation of said members, respectively, and in substantially the transverse center of said shaft, and means operative to rotate said members in opposite directions respectively.

2. In a machine of the class described, a seed supply hopper, a shaft depending from the bottom of said hopper and having a longitudinal bore in communication with said hopper, a pair of seed distributing members rotatably mounted on said shaft in superposed relation, said hopper and shaft each having a discharge aperture therein for the gravitational feed of seed therethrough from said hopper onto one of said members, and means operative to rotate said members.

3. In a machine of the class described, a seed supply hopper, a shaft depending from the bottom of said hopper and having a longitudinal bore in communication with said hopper, a pair of seed distributing members rotatably mounted on said shaft in superposed relation, said hopper and shaft each having a discharge aperture therein for the gravitational feed of seed therethrough from said hopper onto one of said members, said apertures being located upon opposite sides of the axis of rotation of said members, and means operative to rotate said members in opposite directions, respectively.

4. In a machine of the class described, a seed supply hopper, a shaft depending from the bottom of said hopper and having a longitudinal bore in communication with said hopper, a pair of seed distributing members rotatably mounted on said shaft in superposed relation, said hopper and shaft each having a discharge aperture therein for the gravitational feed of seed therethrough from said hopper onto one of said members, a circular flange on said shaft immediately below the aperture in the hopper, a spacing sleeve on the shaft intermediate said members and having a discharge aperture therein registering with the aperture in the shaft and a circular flange below said aperture, the edges of said flanges flaring outwardly and downwardly to direct the seed discharged from said apertures outwardly on to said members, and means operative to rotate said members in opposite directions respectively.

5. In a machine of the class described, a seed supply hopper, having separate compartments, a shaft depending from the bottom of said hopper and having a longitudinal bore in communication with one of said compartments, a pair of seed distributing members rotatably mounted on said shaft in superposed relation, said shaft having a discharge aperture therein for the gravitational feed of seed from said one compartment onto one of said members, and said hopper having a discharge aperture therein for such feed of seed from the other compartment on to the other member, an inclined partition in said shaft for directing seed to the aperture in the shaft, an outwardly and downwardly flaring member below said aperture in the shaft for deflecting the seed outwardly therefrom, an outwardly and downwardly flaring part of said shaft for deflecting the seed outwardly from the discharge aperture in the hopper, and means operative to rotate said members in opposite directions respectively.

6. In a machine of the class described, a seed receptacle having a pair of discharge openings therein, a hopper below said receptacle and having a pair of separate compartments with which said openings communicate, respectively, a shaft depending from said hopper and having a longitudinal bore in communication with one of said compartments, a pair of seed distributing members rotatably mounted on said shaft in superposed relation, said shaft having a discharge aperture therein for the gravitational discharge of seed from one compartment onto one of said members, and said hopper having a discharge aperture therein for such feed of seed from the other compartment on to the other member, means on said shaft for deflecting the seed fed from said discharge apertures outwardly of said members, an apertured slide settable to vary the size of the discharge openings in the supply receptacle, and means operative to rotate said members in opposite directions respectively.

7. A machine of the class described, a seed supply hopper at the front of the machine, a shaft depending from the bottom of said hopper and having a longitudinal bore communicating with said hopper, a pair of seed distributing members rotatably mounted on said shaft in superposed relation, said hopper and shaft each having a discharge aperture therein for gravitational feed of seed therethrough from said hopper onto one of said members, said apertures being disposed on opposite sides of the axis of rotation of said members and substantially in the transverse center of said shaft, and mean operative to rotate said members in opposite directions, respectively, and comprising crank operated gearing, and belt and pulley drives operated by said gearing.

JOSEPH A. MACAULAY.